Jan. 28, 1969  A. H. WAGSTAFFE  3,423,937
HYDRAULIC CONTROL SYSTEM
Filed Oct. 17, 1966

INVENTOR
A. H. WAGSTAFFE
BY
Holcombe, Wetherill + Brisebois
ATTORNEYS

_United States Patent Office_

3,423,937
Patented Jan. 28, 1969

3,423,937
HYDRAULIC CONTROL SYSTEM
Aubrey Hubert Wagstaffe, Lillington, Leamington Spa, England, assignor to Haines and Sherman Limited
Filed Oct. 17, 1966, Ser. No. 587,209
Claims priority, application Great Britain, Oct. 20, 1965, 44,515/65
U.S. Cl. 60—54.5　　　　　　　　　　　　　　6 Claims
Int. Cl. F15b *15/18, 1/06;* F16j *3/00*

ABSTRACT OF THE DISCLOSURE

Hydraulic control systems comprising a first variable capacity chamber constituting a transmitter, a second variable capacity chamber constituting a receiver, a conduit interconnecting the two chambers, and liquid filling the chambers and conduit, so that a force applied to the transmitter causes liquid to be displaced through the conduit to produce a movement at the receiver. Each chamber comprises a bellows at one end and a rod axially disposed within said bellows which occupies a major portion of said chamber.

---

Figure 1:
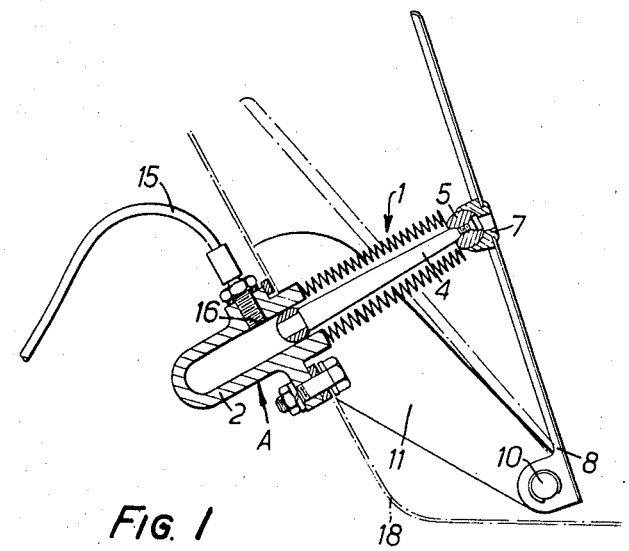

This invention relates to hydraulic control systems comprising a first variable capacity chamber constituting a transmitter, a second variable capacity chamber constituting a receiver, a conduit interconnecting the two chambers, and liquid filling the chambers and conduit, so that a force applied to the transmitter causes liquid to be displaced through the conduit to produce a movement at the receiver.

Many proposals have been made for using such an hydraulic control system to operate the throttle control of a motor vehicle carburettor, but while any system of the above general character is capable of producing movement of the throttle control, very exacting requirements must be met if the system is to be of real practical utility as a throttle control. All the previous proposals of which we are aware fail to meet these requirements and no hydraulic system of throttle control has been adopted by the motor industry, although hydraulic control systems are extensively employed for operating clutches and brakes. The object of the present invention is to provide an hydraulic control system of the above general character which is suitable for operating the throttle control of a motor vehicle carburettor.

To be acceptable for use with modern high speed engines, a throttle control must be capable of very rapid response; it should be capable of operating at a rate corresponding to at least 100 complete cycles (fully closed to fully open and back to fully closed) per minute. The use of high return spring forces is not acceptable and to obtain the required speed of response with the low return forces available, the system must be so constructed that (in the absence of other external loads) an applied force of as little as 2 ounces will produce movement and a force of 1½ lbs. will be sufficient to produce movement over the full range. To obtain such speed and sensitivity of response it is necessary to reduce mechanical friction to a minimum, avoiding sliding contact between parts so far as possible, and to reduce fluid friction by using a liquid of low viscosity and minimising the volume of liquid displaced. We have found in practice that the volume of liquid displaced per inch of stroke should not exceed ⅓ cubic inch, or say, 2 cc. per centimetre of stroke.

To be acceptable as a throttle control, the two variable capacity chambers and the conduit interconnecting them must constitute a sealed system, permanently containing a fixed amount of liquid. Sliding seals reduce the speed of operation and sensitivity of the system and any unsealed system provided with a liquid reservoir for keeping the system fully charged can be temporarily overcharged with liquid by rapid and repeated operation, with the resultant risk that it will be temporarily impossible for the throttle to close fully.

With a sealed system, variations in ambient temperature tend to produce movement at the receiver, due to differential expansion of the liquid and of the system containing it, and clearly the movements so produced must not be so great as to prevent the throttle from being fully opened or fully closed at the lowest or highest temperature to which the system will be subjected in practice.

In accordance with the essential feature of the present invention each of the variable capacity chambers of a sealed hydraulic control system of the character described comprises a bellows tube having a wall of flexible material corrugated in longitudinal section, a guide tube of rigid material aligned with the bellows tube, and in liquid communication with the conduit, the adjacent ends of the bellows tube and guide tube being open and sealingly connected to one another, and a guide rod secured to the end of the bellows tube remote from the guide tube, the guide rod extending through the bellows tube with its surface closely adjacent the inner crests of the corrugations in the wall of the bellows tube and engaging slidably in the guide tube so as to be guided thereby. The bellows tube, being free from mechanical friction, offers very low resistance to movement and the internal guide rod not only prevents lateral distortion of the bellows but also reduces the volume of liquid displaced by a given stroke and the total amount of liquid in the system.

Figure 2:
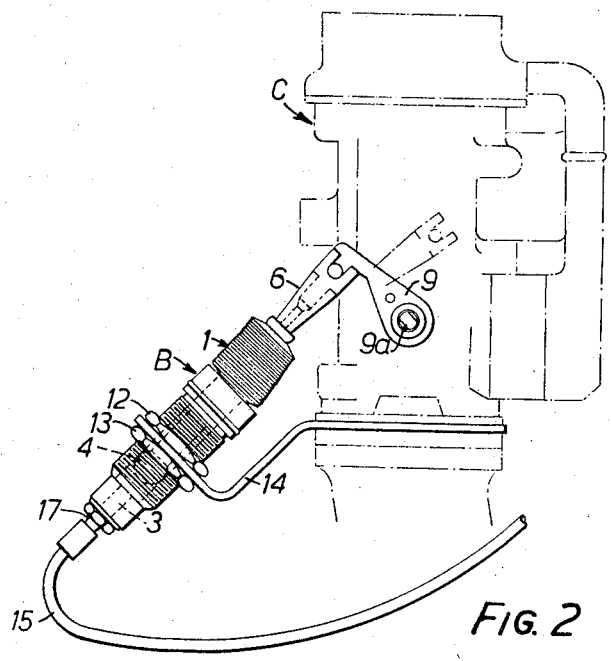

Other features of the invention will sufficiently appear from the appended claims when read in the light of the following description of the preferred form of the invention which is illustrated in the accompanying drawings and which fully meets the requirements set out above. In the drawings:

FIGURE 1 is a side view, partly in section, of the transmitter end of the system; and FIGURE 2 is a side view of the receiver end of the system.

In the system illustrated, a transmitter A (FIGURE 1) is connected by a conduit 15 to a receiver B (FIGURE 2). The transmitter is actuated by a foot-operated accelerator pedal 8 and the receiver B is connected to the throttle regulating lever 9 of a carburettor C.

Referring to FIGURE 1, transmitter A comprises a variable capacity chamber constituted by a guide tube 2 of rigid material having an open end which is sealed by clips or by welding to the adjacent open end of an aligned bellows tube 1. At its other end, the bellows tube 1 is closed by clamping its walls between a cap 5 and the narrow end of a tapered guide rod 4. At its thicker end the guide rod 4 has a ball shaped extension which fits slidingly within the guide tube 2 and is formed with flats which allow liquid to flow past it. The guide rod 4 can thus move longitudinally relative to the body 2 and is also capable of limited angular movement. The guide tube 2 has a closed hemispherical end which stops longitudinal movement of the guide rod 4 before the bellows 2 has been fully compressed and thus prevents excessive end loading of the bellows. The guide rod 4 provides internal support for the bellows, so that compression of the bellows does not result in lateral distortion thereof. The cap 5 secured to the guide rod and the bellows is of part spherical form and fits into a correspondingly shaped socket 7 attached to the accelerator pedal 8. The pedal is hinged at 10 to a bracket 11 which, together with a flange projecting from the guide tube 2, is bolted to a fixed support 18, forming part of the motor vehicle in which the system is used. A spring (not shown) may be fitted to pedal 8 so as to provide additional "feel" to the operation of the system. The guide tube 2 has a port 16 in its side wall which is in sealed connection with one end of conduit 15. The other end of the conduit 15 is sealingly connected to the receiver B (see FIGURE 2).

The receiver B is generally substantially similar in construction to the transmitter A, having a tubular bellows 1 sealed at one end to a guide tube 3 and at the other to a guide rod whose ball shaped end works within the guide tube 3. The port 17 to which conduit 15 is connected is formed in the closed end of the guide tube 3. The cap 6 (corresponding to cap 5) which clamps the bellows to the guide rod is formed as a clevis and engages the operating lever 9 of the carburettor C. Nuts 12 and 13 on an external thread of rigid tube 3 fasten the receiver B to a bracket 14 attached to a fixed point such as the carburettor. Lever 9 is biased to close the throttle (i.e. to turn anti-clockwise in the drawing) and by adjusting nuts 12 and 13 the relationship of the receiver to the lever 9 can be varied in order to provide the setting considered desirable for the full opening and closing of the carburettor lever. Biasing of the lever 9 may be affected by a return spring (not shown) connected between lever 9 and a fixed point such as bracket 14.

The sealed system constituted by the variable capacity chambers A, B and the conduit 15 is filled with a fixed quantity of hydraulic liquid. To facilitate charging the system with liquid, the guide 3 may be formed with a second port, similar to 16, to which a blank plug is fitted after filling.

In operation, foot pressure on pedal 8 moves guide rod 4 to compress bellows 1 of transmitter A. The hydraulic liquid transmits the motion to receiver B, where it expands the bellows 1, turning lever 9 clockwise to open the throttle.

Release of pressure from pedal 8 allows the return spring to bring the receiver B to initial position, this return motion being hydraulically transmitted back to the transmitter A which takes up its initial position.

As already mentioned, temperature changes tend to result in actuation of the receiver without movement of the pedal and to keep this effect within acceptable limits, correct choice of the dimensions of the parts and of the materials used is important. A vehicle carburettor control system may be required to operate over the temperature range —40° to 100° C. To minimise the effect of liquid expansion due to temperature rise, the smallest possible volume of liquid of low coefficient of expansion is used, but the bore of conduit 15 cannot be made too small without unduly increasing liquid friction. Using refined kerosine as hydraulic liquid and with a conduit length of approximately 10 feet, the bore of the conduit is preferably about 0.117 inch in diameter. Refined kerosine is used on account of its low coefficient of expansion, low viscosity and low cost. Since the guide rods 4 of the variable capacity chambers are immersed in the hydraulic liquid, they also should have a low coefficient of expansion. In order to minimise the effect of liquid volume variations, the conduit and the body and bellows of the pumps should be of material having a high coefficient of expansion. A suitable material, which can be moulded into the shape of the bellows tube, is nylon, type 11, which has a coefficient of linear expansion of $150 \times 10^{-6}$ per ° C. The wall thickness of the bellows may lie in the range 0.010″ to 0.020″.

Thin walled bellows tend to be flexible and allow for rapidity of motion, thick walled bellows given higher load capacity at the expense of rapidity of motion.

The residual motion resulting from temperature changes can be accommodated by arranging that (before the system is fitted to the vehicle) the foot pedal has a range of movement larger than the stroke required at the carburettor. For example, if the carburettor requires a movement stroke of about 1⅜ inches, the system may be designed to give any stroke up to approximately 1¾ inches. When fitting the system to the vehicle, the position of the receiver is so adjusted that at average operating temperature the required 1⅜ inches stroke will lie in the middle of the 1¾ inches stroke available. The throttle will then start to open only after an initial idle movement of the pedal and the throttle will be fully open before the hydraulic system completes its stroke. At higher and lower operating temperatures the excess movement available at one end of the stroke will be reduced, but over a wide range of temperatures the system will still open the throttle fully and close it fully.

It will be appreciated by those skilled in the art, that a sealed hydraulic control system as herein described has many applications aside from carburettor control. Examples of such applications are the operation of diesel engine air valves, metering pumps, out-board motor controls and window-winding mechanisms. Where appropriate, a single transmitter can be connected to two or more receivers which are operated simultaneously, or a single receiver can be connected to two or more transmitters which can be used alternatively to operate the receiver.

I claim:

1. An hydraulic control system, suitable for operating the throttle control of a motor vehicle carburetor, comprising a first variable capacity liquid chamber to which a controlling force can be applied, a second variable capacity liquid chamber changes of whose capacity are adapted to produce movement of a member to be controlled, a liquid conduit interconnecting the two chambers, the two chambers and the conduit together constituting a sealed liquid filled system permanently containing a fixed quantity of liquid, wherein each of the variable capacity chambers comprises a bellows tube having a wall of flexible material corrugated in longitudinal section and having one open and one closed end, a guide tube of rigid material disposed in axial alignment with the bellows tube adjacent to the open end thereof, the guide tube having a liquid connection to the conduit and having its end adjacent to the bellows tube open and sealingly connected to the open end of the bellows tube, and a guide rod secured to the closed end of the bellows tube and extending through the length of the bellows tube and making sliding guided engagement in the guide tube, the guide rod displacing a major portion of the volume of the interior of the bellows tube and having its surface closely adjacent to the inner crest of the corrugations in the wall of the bellows tube.

2. A system in accordance with claim 1 in which the parts of the variable capacity chamber are so dimensioned that the change in liquid capacity of the chamber caused by axial displacement of the end of the bellows tube to which the guide rod is secured does not exceed ⅓ cubic inch per inch linear displacement of the guide rod.

3. A system in accordance with claim 1 in which the bellows tube is made of nylon and has a wall thickness in the range 0.010 to 0.020 inch.

4. A system in accordance with claim 1 in which the liquid filling the system is kerosine.

5. A system in accordance with claim 1 in which the internal diameter of the conduit interconnecting the two variable capacity chambers is approximately 0.117 inch.

6. An hydraulic control system, suitable for operating the throttle control of a motor vehicle carburetor, comprising a first variable capacity liquid chamber to which a controlling force can be applied, a second variable capacity liquid chamber changes of whose capacity are adapted to produce movement of a member to be controlled, a liquid conduit interconnecting the two chambers, the two chambers and the conduit together constituting a sealed liquid filled system permanently containing a fixed quantity of liquid, wherein each of the variable capacity chambers comprises a bellows tube having a wall of flexible material corrugated in longitudinal section, a guide tube of rigid material aligned with the bellows tube, and in liquid communication with the conduit, the adjacent ends of the bellows tube and guide tube being open and sealing connected to one another, and a guide rod secured to the end of the bellows tube remote from the guide tube, the guide rod extending through the bellows tube with its surface closely adjacent the inner crests of the corrugations in the wall of the bellows tube and having means engaging in the guide tube and mounting the guide rod for sliding guided movement and limited angular movement relative to the guide tube.

References Cited

UNITED STATES PATENTS

| | | | |
|---|---|---|---|
| 1,885,121 | 11/1932 | Loweke | 74—18.2 X |
| 2,068,626 | 1/1937 | Clifford | 92—43 |
| 2,164,475 | 7/1939 | Schjolin | 60—54.5 X |
| 2,706,020 | 4/1955 | Freers et al. | 92—44 X |
| 2,798,507 | 7/1957 | St. Clair | 92—47 X |
| 2,966,328 | 12/1960 | Burnsworth | 60—54.5 X |
| 2,966,929 | 1/1961 | Brown | 92—43 |

FOREIGN PATENTS

| | | |
|---|---|---|
| 1,229,853 | 3/1960 | France. |
| 559,844 | 3/1944 | Great Britain. |

MARTIN P. SCHWADRON, *Primary Examiner.*

I. C. COHEN, *Assistant Examiner.*

U.S. Cl. X.R.

92—38, 43, 44, 47